(12) United States Patent
Chiao et al.

(10) Patent No.: US 6,231,512 B1
(45) Date of Patent: May 15, 2001

(54) METHOD AND APPARATUS FOR PARAMETRIC HARMONIC IMAGING

(75) Inventors: Richard Yung Chiao, Clifton Park; Bruno Hans Haider, Ballston Lake, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/322,747

(22) Filed: May 28, 1999

(51) Int. Cl.[7] ....................................................... A61B 8/00
(52) U.S. Cl. ............................................................. 600/447
(58) Field of Search .................................. 600/443, 447; 128/916; 73/625, 626; 342/375; 340/16 R; 367/7, 11

(56) References Cited

U.S. PATENT DOCUMENTS

| | | | |
|---|---|---|---|
| 5,632,277 | 5/1997 | Chapman et al. | 128/660.07 |
| 5,891,038 | * 4/1999 | Seyed-Bolorforosh et al. | 600/447 |
| 5,957,852 | * 9/1999 | Hossack et al. | 600/447 |
| 5,977,911 | * 11/1999 | Green et al. | 342/357 |
| 6,077,226 | * 6/2000 | Washburn et al. | 600/447 |
| 6,102,858 | * 8/2000 | Hatfield et al. | 600/443 |

OTHER PUBLICATIONS

"A New Imaging Technique Based On The Nonlinear Properties Of Tissues," Michalakis A. Averkiou, DN Roundhill, and JE Powers, IEEE Symposium 1997, 0–7803–4153–8/97/$10.00, pp. 1561–1566.

* cited by examiner

Primary Examiner—Francis J. Jaworski
Assistant Examiner—Ali M. Imam
(74) Attorney, Agent, or Firm—Marvin Snyder; Douglas E. Stoner

(57) ABSTRACT

Ultrasound imaging of biological tissue using multiple harmonic response parameters is performed by transmitting a pulse centered at fundamental frequency $f_0$ and filtering the returned beamformed signal with a bandpass filter centered at a frequency less than $f_0$. The fundamental transmit pulse spectrum and the receive filter passband are chosen to have negligible overlap so that substantially only harmonic signal components are bandpassed. The harmonic signals leaked through the passband from harmonic spectra centered at DC or at $f_0$ are detected and processed to form display image data which are displayed on a display subsystem. The signal content leaked through the passband is a function of the entire set of harmonic response parameters.

23 Claims, 4 Drawing Sheets

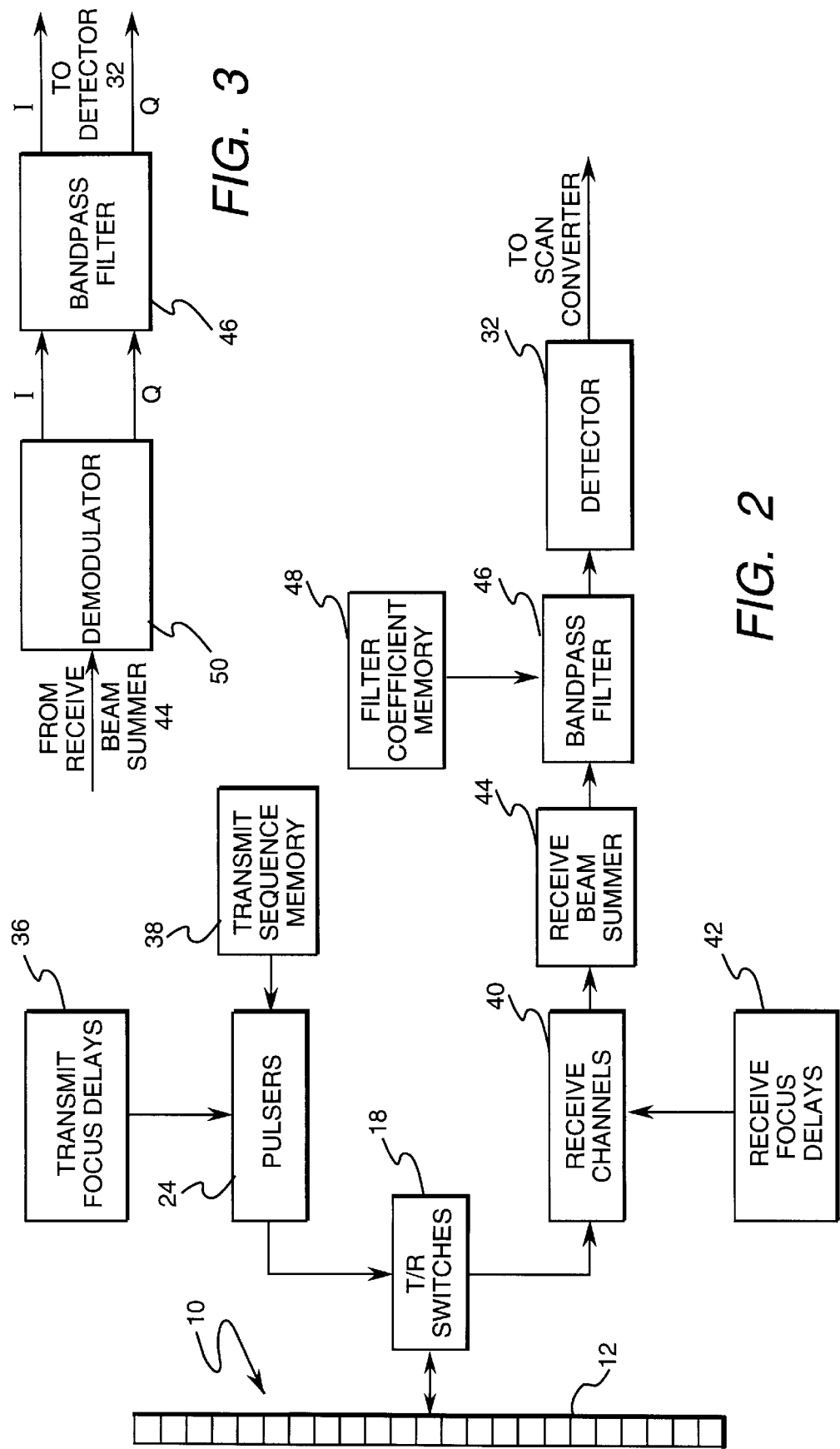

METHOD AND APPARATUS FOR PARAMETRIC HARMONIC IMAGING

FIELD OF THE INVENTION

This invention generally relates to ultrasound imaging and, more particularly, to harmonic imaging of the human anatomy for the purpose of medical diagnosis.

BACKGROUND OF THE INVENTION

Conventional ultrasound scanners create two-dimensional B-mode images of tissue in which brightness of a pixel is based on intensity of the echo return. Conventional B-mode images are formed from a combination of fundamental and harmonic signal components, the former being direct echoes of the transmitted pulse and the latter being generated in a nonlinear medium, such as tissue, from finite-amplitude ultrasound propagation. In some instances, e.g., obese patients, ultrasound images can be improved by suppressing the fundamental and emphasizing the harmonic signal components.

Propagation of ultrasound beams in biological tissues is known to be nonlinear, giving rise to generation of harmonics. In harmonic imaging, energy is transmitted at a fundamental frequency $f_0$ and an image is formed with energy at the second harmonic $2f_0$. Some of the characteristics of the nonlinearly generated second harmonic beams are: a narrower beam, lower sidelobes than the fundamental, and beam formation in a cumulative process, i.e., the second harmonic continually draws energy from the fundamental during propagation. These characteristics contribute to lateral resolution improvements, reduction of multiple reflections or other aberrations due to difficult windows, (i.e., body locations at which placement of a probe does not result in a good image) and clutter reduction due to inhomogeneities in the tissue and skin layers.

At least two methods for harmonic imaging in an ultrasound scanner are known. In one method, the transducer elements of a phased array are activated by waveforms that have a fundamental frequency and are time-delayed to produce an ultrasound beam which is focused at a transmit focal zone, transmission of a single focused beam being referred to as a "firing". The echoes returned from the body being interrogated are transduced by the array elements into electrical signals and time-delayed to form a receive vector of acoustic data having both fundamental and harmonic signal components. A receive filter removes the fundamental signal component and isolates the harmonic signal component which is then detected, scan-converted and displayed.

In a second method, each transducer element is activated by a first waveform having one polarity during a first transmit firing and by a second waveform having the opposite polarity during a second transmit firing. Both waveforms are broadband pulses having a fundamental frequency. Activations of the transducer elements during each firing are time-delayed to produce an ultrasound beam which is focused at the same transmit focal zone. Each firing results in a respective receive vector of acoustic data, each vector having both fundamental and even harmonic signal components. When the receive vectors are vector summed, however, the fundamental signal components substantially cancel, thereby isolating an even harmonic signal component that is then detected, scan-converted and displayed.

Drawbacks to the first method include the following: (a) the received signal is narrowband and hence resolution is poor; (b) it is difficult to filter the large fundamental signal component completely, so there is some residual fundamental signal that degrades contrast improvement; and (c) if the transmit signal contains harmonic frequencies, it is not possible to filter out those harmonic frequencies.

The second method does not present the disadvantages of the first method. However, a major drawback of the second method is that it requires two firings to acquire harmonic data corresponding to a particular transmit focal zone and hence always decreases the frame rate by half. The second method is also susceptible to motion artifacts. For lower-frequency transducers, the second method is often not realizable.

SUMMARY OF THE INVENTION

A method and apparatus for performing parametric harmonic imaging enables different tissue types to be clearly differentiated in diagnostic ultrasound imaging. The nonlinear tissue response R(p) due to a given pressure pulse p(t) may be modeled as a power series:

$$R(p(t)) = \sum_{k=0}^{\infty} \alpha_k p^k(t) \tag{1}$$

where $\alpha_k$ are the harmonic response parameters. Since the harmonic response parameters may be significantly different between healthy and diseased tissue, the method of the invention images tissue using these harmonic response parameters.

In accordance with a preferred embodiment of the invention, a single transmit firing is used to image multiple harmonic response parameters. Parametric harmonic imaging consists of transmitting a pulse centered at frequency $f_0$ and receiving the returned signal with a bandpass filter centered at a frequency less than $f_0$. The fundamental transmit pulse spectrum and the receive filter passband are chosen to have negligible overlap in order to bandpass substantially only harmonic signal components. This method detects the harmonic signals leaked into the passband from harmonic spectra centered at DC (zero frequency) or at $f_0$. The signal content leaked into the passband is a function of the entire set of harmonic response parameters.

BRIEF DESCRIPTION OF THE DRAWINGS

FIG. 2 is a block diagram showing portions of an ultrasound imaging system in accordance with one preferred embodiment of the invention.

FIG. 3 is a block diagram showing portions of an ultrasound imaging system in accordance with another preferred embodiment of the invention.

DETAILED DESCRIPTION OF THE PREFERRED EMBODIMENTS

Figure 1:
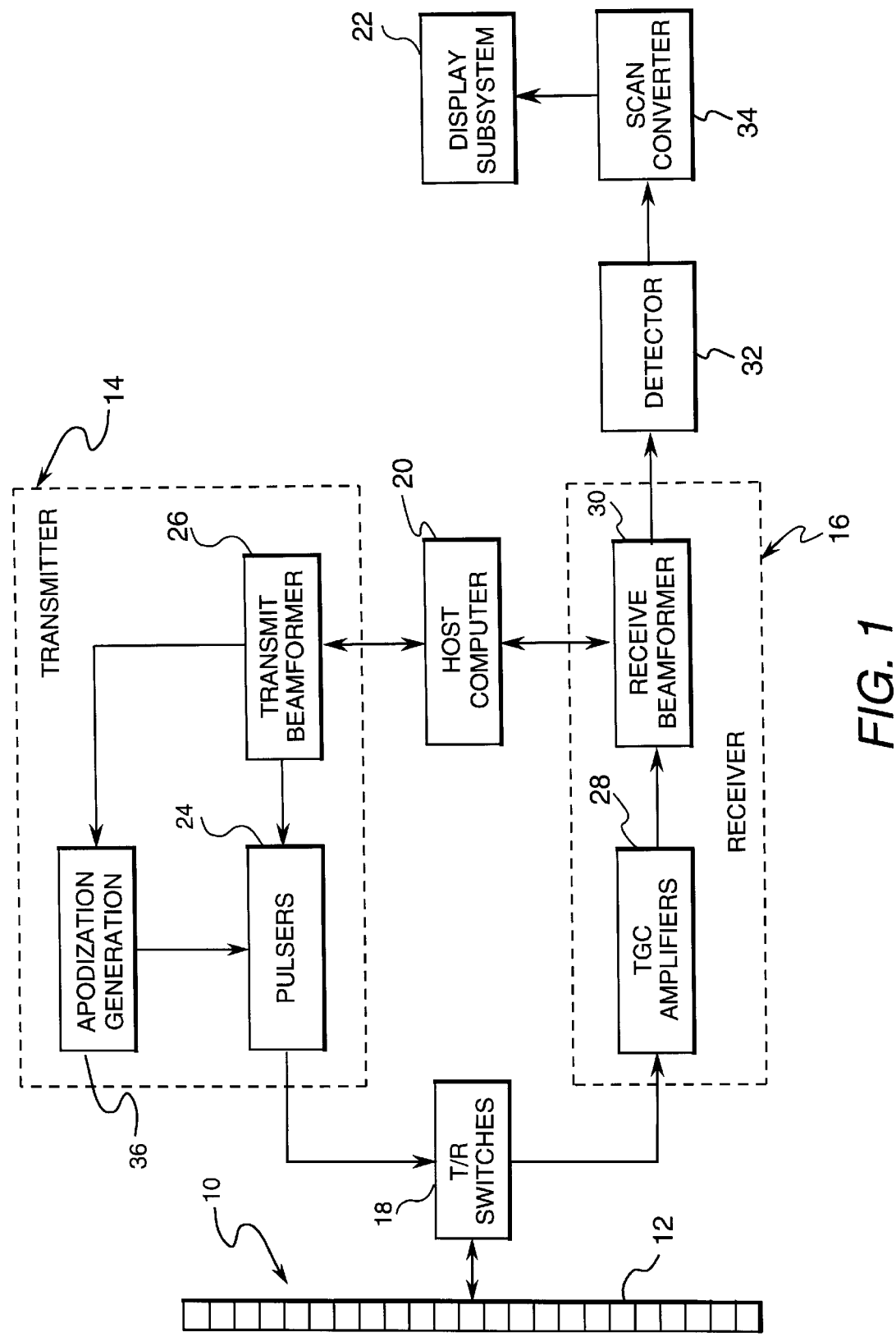
FIG. 1 is a block diagram of a conventional ultrasound imaging system.

The invention can be incorporated in an ultrasonic imaging system of the type outlined generally in FIG. 1. This imaging system comprises a transducer array 10 of separately driven piezoelectric transducer elements 12, each of which produces a burst of ultrasonic energy when energized by a pulsed waveform produced by a transmitter 14. The ultrasonic energy reflected back to transducer array 10 from the object under study (not shown) is converted to an electrical signal by each receiving transducer element 12 and applied separately to a receiver 16 through a set of transmit/receive (T/R) switches 18. Transmitter 14 and receiver 16 are operated under control of a host computer or master controller 20 responsive to commands by a human operator. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a display subsystem 22, typically comprising a video processor and a display monitor (not shown).

Under the direction of host computer 20, transmitter 14 drives transducer array 10 such that the ultrasonic energy is transmitted as a directed focused beam. To accomplish this, respective time delays are imparted to a multiplicity of pulsers 24 by a transmit beamformer 26. Host computer 20 determines the conditions under which the acoustic pulses will be transmitted. With this information, transmit beamformer 26 will determine the timing and amplitudes of each of the transmit pulses to be generated by pulsers 24. The amplitudes of each transmit pulse are generated by an apodization generation circuit 36, such as a high-voltage controller which sets the power supply voltage to each pulser. Pulsers 24 in turn send the transmit pulses to each of elements 12 of transducer array 10 via T/R switches 18, which protect the time-gain compensation (TGC) amplifiers 28 from high voltages which may exist at the transducer array. The apodization weighting for a particular transmit channel is a function of the distance between the transmit focal position and the transducer element associated with that transmit channel. Weightings are provided by apodization generation circuitry 36, which may comprise a set of digital-to-analog converters that apply the weighting data from transmit beamformer 26 to pulsers 24. By appropriately adjusting the transmit focus time delays in a conventional manner and also adjusting the transmit apodization weightings, a multiplicity of ultrasonic waves transmitted by individual transducer elements can be combined to form a directed and focused transmit beam. The apodization weightings and the transmit focus time delays may be set by the host computer based on system programming and operator inputs.

Each burst of ultrasonic energy is reflected from objects located at successive ranges along each transmit beam. The resulting echoes are transduced into analog electrical echo signals by each transducer element 12 and a sample of the magnitude of the echo signal at a particular point in time represents the amount of reflection occurring at a specific range. Due to differences in the propagation paths between a reflecting point and each transducer element 12, the echoes are not detected simultaneously and their amplitudes are not equal. Receiver 16 amplifies the separate echo signals via a respective TGC amplifier 28 in each receive channel. Time-gain compensation is carried out by increasing or decreasing TGC amplifier gain as a function of depth. The amount of amplification provided by the TGC amplifiers is controlled from a TGC circuit (not shown) which is set by the host computer and hand operation of potentiometers (not shown). The analog echo signals are then sent to receive beamformer 30.

Under the direction of host computer 20, receive beamformer 30 tracks the direction of the transmitted beam. Receive beamformer 30 converts the analog signals to digital signals, imparts the proper time delays and receive apodization weightings to each amplified echo signal, and sums the resulting signals to provide an echo signal which accurately represents the total ultrasonic energy reflected from a point located at a particular range along one ultrasonic beam. The receive focus time delays are computed in real-time using specialized hardware, or are read from a look-up table. The receive channels also include circuitry for filtering the received pulses. The receive apodization weightings and receive focus time delays may be set by the host computer based on system programming and operator inputs.

The time-delayed receive signals are summed and provided to a signal processor or detector 32 which converts the summed receive signals to display data. In a typical grayscale display image, the display data are the envelope of the signal with some additional processing, such as edge enhancement and logarithmic compression. For radiofrequency (RF) data, the envelope can be detected using a low-pass filter; for baseband data, the envelope can be detected using an envelope detector which produces a signal representing $(I^2+Q^2)^{1/2}$, where I is the in-phase signal component and Q is the quadrature signal component of the baseband data.

In general, the display data are converted by scan converter 34 into Cartesian Coordinate X-Y format for video display. The scan-converted frames are passed to a video processor (not shown) incorporated in display subsystem 22. The video processor maps the video data for display and sends the mapped image frames to the display subsystem.

The images displayed on a video monitor (not shown) of display subsystem 22 are produced from an image frame of data in which each datum determines the intensity or brightness of a respective pixel in the display. An image frame may comprise, for example, a 256×256 data array in which each intensity datum is an 8-bit binary number that indicates pixel brightness. The brightness of each pixel on the display monitor is continuously refreshed by reading the value of its corresponding element in the data array in a well-known manner. Each pixel has an intensity value which is a function of the backscatter cross section of a respective sample volume in response to interrogating ultrasonic pulses.

In FIG. 2, which shows portions of an ultrasound imaging system in accordance with a preferred embodiment of the invention, each transducer element in the transmit aperture is pulsed by a respective pulser 24 in accordance with a transmit sequence stored in a transmit sequence memory 38. If the pulsers are bipolar, the sequence is +1's and −1's. In response to the transmit sequence, each pulser supplies a waveform to the associated transducer element. The transmit sequence can be optimized to ensure that maximum energy passes through the transducer passband. The appropriate transmit sequence can be selected depending on the operating characteristics of the transducer and the desired imaging response for a point target, known in the art as the point spread function. The ultrasound pulses transmitted by the transducer array have a broad frequency band centered at a fundamental frequency $f_0$.

Pulsers 24 drive elements 12 of transducer array 10 such that the ultrasonic energy produced during a transmit firing is focused at a transmit focal position. To accomplish this, transmit focus time delays 36 are imparted to the respective pulsed waveforms output by the pulsers in accordance with the transmit codes. By appropriately adjusting the transmit focus time delays in a conventional manner, the ultrasonic beams can be focused at a multiplicity of transmit focal positions to effect a scan in an image plane.

For each transmit, the echo signals from transducer elements 12 are supplied to respective receive channels 40 of the receive beamformer. Under the direction of host computer 20 (FIG. 1), the receive beamformer tracks the direction of the transmitted beam. The receive beamformer imparts the proper receive focus time delays 42 to the received echo signal and sums the delayed received echo signals to provide an echo signal which accurately indicates the total ultrasonic energy reflected from a particular transmit focal position along a transmit beam. The time-delayed receive signals are summed in a receive beam summer 44 for each transmit firing. The summed receive signal for each transmit firing is provided to a bandpass filter 46, the taps of which receive respective filter coefficients from a filter coefficient memory 48. The set of filter coefficients is designed to produce a bandpass filter having a passband centered at a frequency less than $f_0$. The transmit sequence and bandpass filter coefficients are chosen so that the fundamental transmit pulse spectrum and the receive filter passband have negligible overlap, so that bandpass filter 46 will pass substantially only the harmonic signal to detector 32. The bandpass filter coefficients are designed so that even and odd harmonic signal components are bandpassed for further processing, i.e., (as shown in FIG. 1), envelope detection in detector 32, scan conversion in scan converter 34 and video processing in display subsystem 22.

Using the foregoing method, an image can be displayed in which each receive vector comprises harmonic signal components leaked into the passband of bandpass filter 46. From Eq. (1), the k-th harmonic signal component is given by $p^k(t)$. The corresponding spectrum for the k-th harmonic is thus given by the convolution of k copies of the fundamental pulse spectrum $P_1(f)$:

$$P_k(f)=P_1(f)*P_1(f)* \ldots (k \text{ copies total}) \ldots *P_1(f) \quad (2)$$

where $P_1(f)$ is the Fourier transform of $p(t)$.

Figure 4:
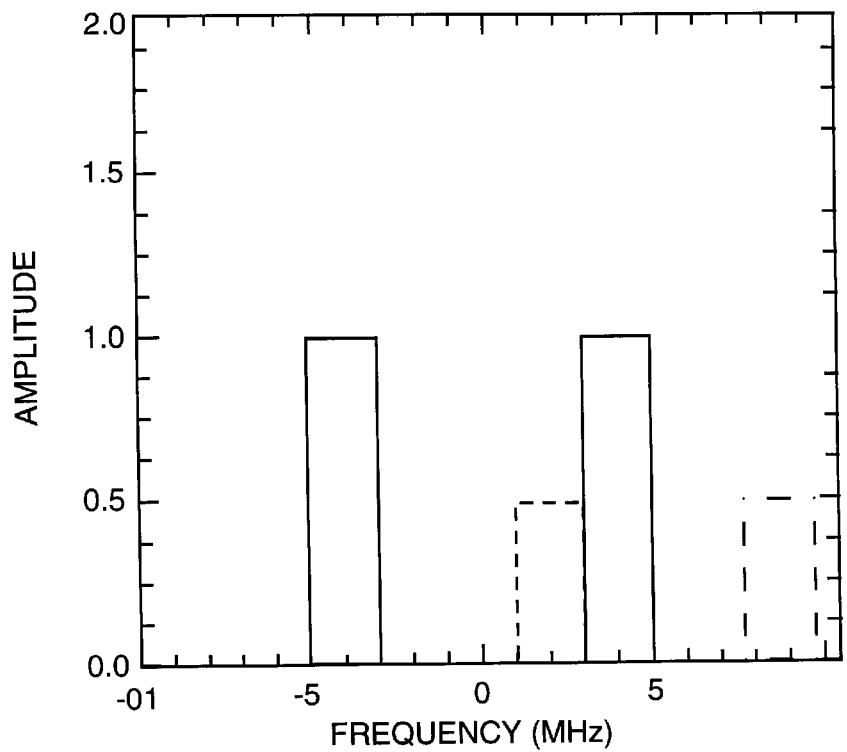
FIGS. 4 through 7 are graphs of amplitude versus frequency for fundamental, second harmonic, third harmonic and fourth harmonic frequency signal components, respectively. The passband for parametric harmonic imaging is indicated by dotted lines, while the passband for second harmonic imaging is indicated by dashed lines.
Figure 5:
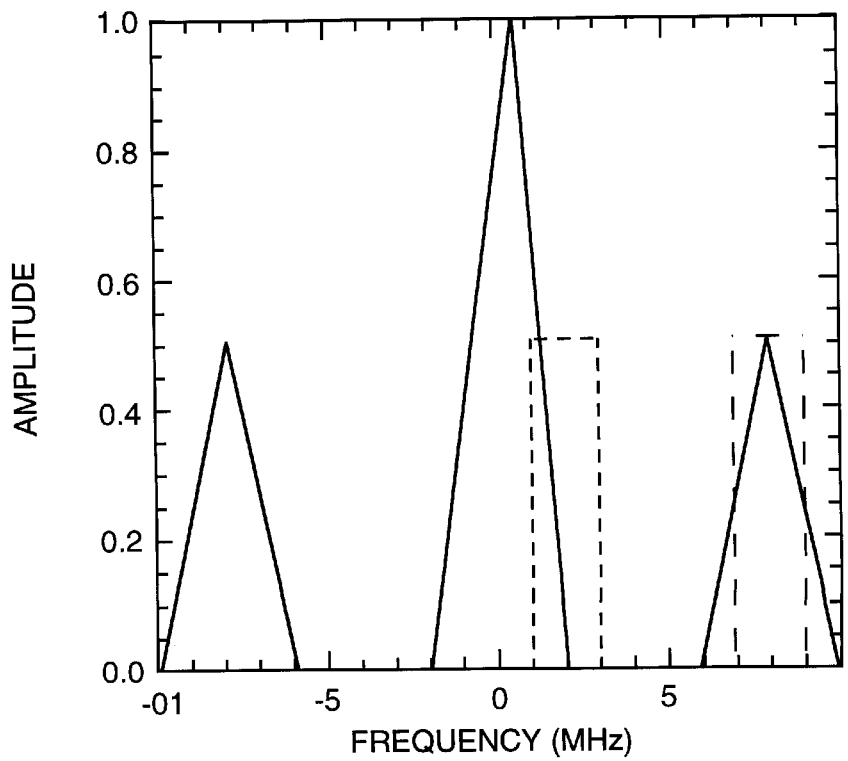
Figure 6:
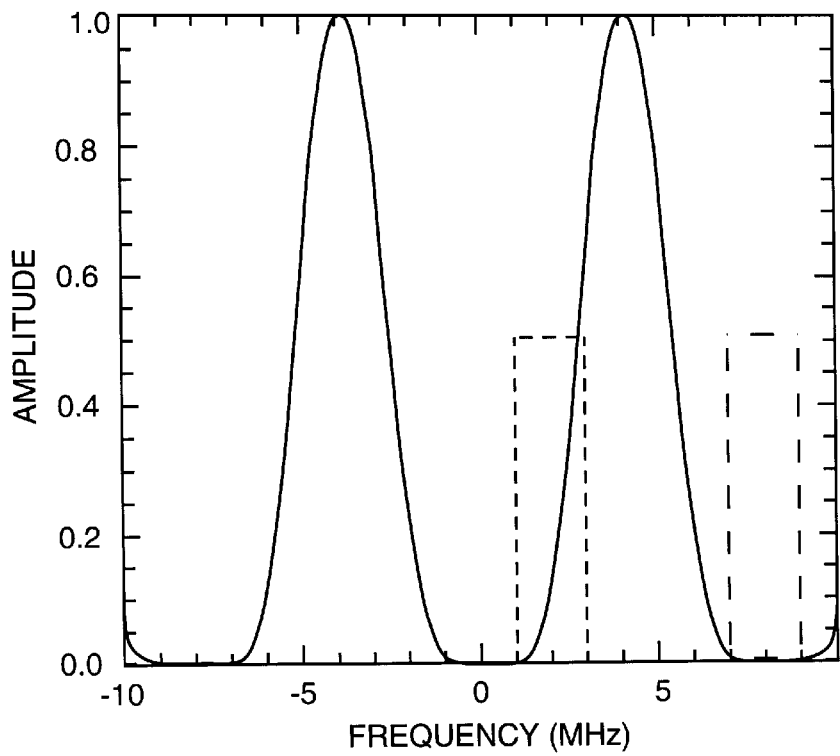
Figure 7:
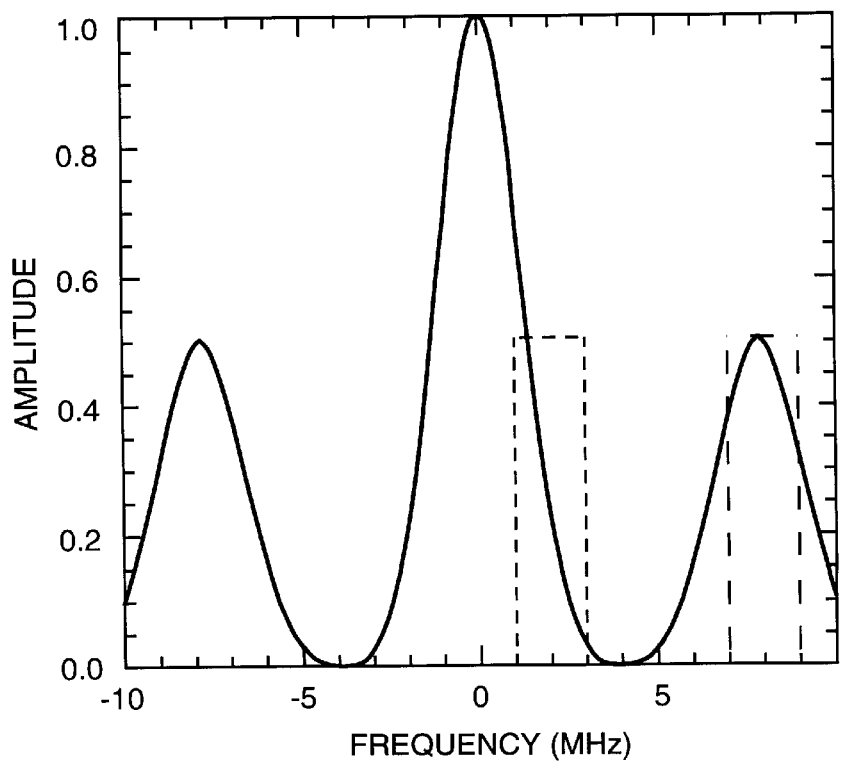

FIG. 4 shows the spectrum for the situation when k=1, i.e., for a fundamental signal component having a center frequency $f_0$=4 MHz. The dashed line indicates the ideal passband for second harmonic imaging in accordance with the prior art, while the dotted line indicates the ideal passband for parametric harmonic imaging in accordance with the invention. The spectra for the situations k=2, 3 and 4 are shown in FIGS. 5, 6 and 7, respectively. As seen in FIGS. 5 and 7, the spectrum for an even harmonic (e.g., k=2 or 4) has a large spectral peak at zero frequency (DC) as well as smaller peaks at $\pm 2 f_0$. As seen in FIG. 6, the spectrum for an odd harmonic (e.g., k=3) has large spectral peaks at $\pm f_0$. In addition, the bandwidth of the harmonic spectra increases with increasing order. Thus a receive filter with passband between DC and the transmitted fundamental frequency passes to the detector the harmonic signals leaked into the filter passband from harmonic spectra centered at DC for even harmonics or at $f_0$ for odd harmonics. The signal content leaked into the receive filter passband is a function of the entire set of harmonic response parameters.

In accordance with a preferred embodiment, the filter coefficients may be selected to achieve the desired bandpass filtering of harmonic signal components. Different sets of filter coefficients can be stored in look-up tables inside the host computer memory and the desired set of coefficients can be selectable by the system operator.

The parametric harmonic imaging technique disclosed herein can be applied to radiofrequency signals or to baseband signals. In the latter instance, the radiofrequency signals produced by receive beamsummer 44 are demodulated into in-phase and quadrature (I/Q) signal components by a demodulator 50, as shown in FIG. 3. The I/Q signal components are then bandpass filtered by filter 46, which can be either a real or complex filter. The bandpass-filtered I/Q signal components are then provided to detector 32 for forming the envelope by computing the quantity $(I^2+Q^2)^{1/2}$. The envelope of the signal undergoes additional processing, such as logarithmic compression, to form display data which are provided to scan converter 34.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for imaging matter comprising the steps of:
    transmitting wave energy during a transmit firing, said wave energy being focused at a transmit focal position and having a transmit pulse spectrum centered at a fundamental frequency;
    transducing wave energy transmitted in said transmit firing and returned from matter to form a set of receive signals;
    beamforming said set of receive signals to form a receive vector comprising acoustic data acquired along a receive scan line;
    bandpass filtering signal components of said receive vector through a receive passband having a center frequency less than said fundamental frequency so as to form a bandpassed receive vector;
    processing said bandpassed receive vector to form display image data; and
    displaying said display image data.

2. The method as recited in claim 1, including the step of detecting harmonic signals leaked into said receive passband from harmonic spectra centered at DC.

3. The method as recited in claim 1, including the step of detecting harmonic signals leaked into said receive passband from harmonic spectra centered at said fundamental frequency.

4. The method as recited in claim 1, wherein said receive passband lies between DC and said transmit pulse spectrum.

5. The method as recited in claim 1, wherein said receive passband and said transmit pulse spectrum have negligible overlap.

6. The method as recited in claim 1, wherein said wave energy is ultrasonic.

7. The method as recited in claim 1, wherein the processing step comprises envelope detecting said filtered receive vector to form an envelope signal.

8. An imaging system comprising:
    a transducer array including a multiplicity of transducer elements for transmitting wave energy in response to electrical activation and for transducing returned wave energy into electrical signals;
    a transmitter coupled to said transducer array and programmed to activate a plurality of said transducer elements to transmit wave energy focused at a transmit focal position and having a transmit pulse spectrum centered at a fundamental frequency during a transmit firing;

a receiver programmed to beamform a set of receive signals produced by said transducer array following said transmit firing to form a receive vector comprising acoustic data acquired along a receive scan line;

a bandpass filter for filtering signal components of said receive vector through a receive passband having a center frequency less than said fundamental frequency so as to form a filtered receive vector;

a processing subsystem for processing said filtered receive vector to form display image data; and a display subsystem for displaying said display image data.

9. The system as recited in claim 8, wherein said processing subsystem detects harmonic signals leaked into said receive passband from harmonic spectra centered at DC.

10. The system as recited in claim 8, wherein said processing subsystem detects harmonic signals leaked into said receive passband from harmonic spectra centered at said fundamental frequency.

11. The system as recited in claim 8, wherein said receive passband lies between DC and said transmit pulse spectrum.

12. The system as recited in claim 8, wherein said receive passband and said transmit pulse spectrum have negligible overlap.

13. The system as recited in claim 8, wherein said transducer elements comprise piezoelectric elements.

14. The system as recited in claim 8, wherein said processing subsystem comprises an envelope detector for detecting an envelope from said filtered receive vector.

15. An imaging system comprising:

a transducer array including a multiplicity of transducer elements for transmitting wave energy in response to electrical activation and for transducing returned wave energy into electrical signals;

a display monitor for displaying image data;

a transmitter;

a receiver;

processing circuitry coupled to said receiver; and a host computer coupled to said transmitter and said receiver, said host computer being programmed to instigate and control the steps of:

activating transducer elements of said array to transmit wave energy focused at a transmit focal position and having a transmit pulse spectrum centered at a fundamental frequency during a transmit firing;

beamforming a set of receive signals produced by said transducer array following said transmit firing to form a receive vector comprising acoustic data acquired along a receive scan line;

bandpass filtering signal components of said receive vector through a passband having a center frequency less than said fundamental frequency so as to form a filtered receive vector;

processing said filtered receive vector to form display image data; and providing to said display monitor an image signal which is a function of said display image data.

16. The system as recited in claim 15, wherein said receive passband lies between DC and said transmit pulse spectrum.

17. The system as recited in claim 15, wherein said receive passband and said transmit pulse spectrum have negligible overlap.

18. The system as recited in claim 15, wherein said transducer elements comprise piezoelectric elements.

19. A method for imaging matter comprising the steps of:

transmitting wave energy during a transmit firing, said wave energy being focused at a transmit focal position and having a transmit pulse spectrum centered at a fundamental frequency;

transducing wave energy transmitted in said transmit firing and returned from matter to form a set of receive signals;

beamforming said set of receive signals to form a receive vector comprising acoustic data acquired along a receive scan line;

demodulating said set of receive signals to form first and second baseband signal components;

bandpass filtering said first and second baseband signal components through a receive passband having a center frequency less than said fundamental frequency so as to form first and second bandpassed baseband signal components;

detecting said first and second bandpassed baseband signal components to form an envelope signal;

processing said envelope signal to form display image data; and displaying said display image data.

20. An imaging system comprising:

a transducer array including a multiplicity of transducer elements for transmitting wave energy in response to electrical activation and for transducing returned wave energy into electrical signals;

a transmitter coupled to said transducer array and programmed to activate a plurality of said trans-ducer elements to transmit wave energy focused at a transmit focal position and having a transmit pulse spectrum centered at a fundamental frequency during a transmit firing;

a receiver programmed to beamform a set of receive signals produced by said transducer array following said transmit firing to form a receive vector comprising acoustic data acquired along a receive scan line;

a demodulator for demodulating said set of receive signals to form first and second baseband signal components;

a bandpass filter for filtering said first and second baseband signal components through a receive passband having a center frequency less than said fundamental frequency so as to form first and second bandpassed baseband signal components;

an envelope detector for detecting an envelope of said first and second bandpassed baseband signal components;

a processing subsystem for processing said envelope to form display image data; and a display subsystem for displaying said display image data.

21. An ultrasound imaging system comprising:

a transducer array including a multiplicity of ultrasound transducer elements for transmitting ultrasound waves in response to electrical activation and for transducing returned ultrasound waves into electrical signals;

a transmit beamformer for activating ultrasound transducer elements of said transducer array to transmit an ultrasound beam focused at a transmit focal position and having a transmit pulse spectrum centered at a fundamental frequency;

a multiplicity of receive channels respectively coupled to said multiplicity of ultrasound transducer elements for receiving a set of receive signals respectively produced by said multiplicity of ultrasound transducer elements following transmission of said ultrasound beam;

a receive beamformer for beamforming said set of receive signals to form a receive vector comprising acoustic data acquired along a receive scan line;

a filter for passing harmonic signal components of said receive vector leaked into a passband of said filter and lying between DC and said transmit pulse spectrum to form a filtered receive vector;

a processing subsystem for processing said filtered receive vector to form display image data; and a display subsystem for displaying said display image data.

22. The system as recited in claim 21, wherein said passband and said transmit pulse spectrum have negligible overlap.

23. A method for imaging ultrasound reflection properties of an acoustic medium, comprising the steps of:

transmitting into the acoustic medium ultrasound wave energy having a transmit pulse spectrum centered at a fundamental frequency;

transducing ultrasound wave energy reflected from the acoustic medium into a set of electrical receive signals;

detecting harmonic signal components of said receive signals leaked through a passband lying between DC and said transmit pulse spectrum to form bandpassed receive signals;

processing said bandpassed receive signals to form display image data; and displaying said display image data.

* * * * *